Patented Dec. 23, 1947

2,433,029

UNITED STATES PATENT OFFICE 2,433,029

METHOD OF PREPARING ZEIN-CONTAINING SOLUTIONS

Roy E. Coleman, Chicago, Ill., assignor to Time, Incorporated, a corporation of New York No Drawing. Application June 2, 1944, Serial No. 538,555

16 Claims. (Cl. 106—153)

This invention relates to commercially usable solutions, ink vehicles and coating compositions of the alcohol-soluble corn gluten proteins or other prolamine gluten proteins, designated "prolamin-containing proteins" and "zein-containing proteins" in my copending application Serial No. 467,402, filed November 30, 1942, now Patent No. 2,352,604, granted July 4, 1944, of which the instant application is a continuation-in-part.

As pointed out in my Patent No. 2,185,110, granted December 26, 1939, commercial zein is soluble in a wide variety of solvents and solvent mixtures and the resulting solutions in the solvents described and claimed in that patent have, in general, slow gelling or substantially non-gelling tendencies for practical periods of time, in the order of about 3 to about 6 months, where these solutions contain limited amounts of added water, not more than about 5% of the solution in excess of the amount of water normally present in the commercial zein. It was found that the presence of water in the solutions of commercial zein described and claimed in my patent, substantially in excess of the proportions above indicated, disturbs the solvent characteristics of the solvents and materially detracts from the stability and quality of the solutions. It was also found that the amount of water that could be present in these solutions and still maintain solubility of the zein in the solvents was limited.

In accordance with the present invention I have found that solutions of corn gluten proteins when treated and obtained as hereinafter described, are characteristically different from corresponding solutions of commercial zein obtained in accordance with prior art methods in that the solutions of my invention containing water substantially in excess of the proportions above indicated, say in the order of 10 to 30%, or even more, of water, are stable and do not gel and are reasonably constant in their characteristics for practical periods of time up to about a year, in many instances. Moreover, the solutions of the zein-containing proteins of my invention may contain amounts of water, based upon the main solvent constituent, which are considerably in excess of the amounts of water that can be tolerated in corresponding solutions of commercial zein.

The solutions of the present invention are considerably less viscous than are the corresponding solutions of the prior art and have substantially no tendency, or at most but a slight tendency, to thicken or become heavier in body upon standing for periods of time up to about a year, in many instances, and exhibit substantially none of the gelling tendencies characteristic of the prior art zein solutions.

The solutions of the present invention are prepared by boiling or distilling a corn gluten or other prolamine gluten extract solution comprising extracted zein-containing proteins, a relatively high boiling point zein solvent, a diluent such as a relatively low boiling point zein solvent and water to remove an amount of liquid, principally the relatively low boiling point zein solvent, corresponding approximately with the amount of relatively low boiling point zein solvent present in the extract solution. The diluent may or may not be by itself a solvent for zein, but preferably is.

The corn gluten extract solution, for example, may be prepared in accordance with the methods described and claimed in my copending application, Serial No. 467,402, although it may also be prepared by other methods. The following examples illustrate methods of preparing the extract solutions and of obtaining the novel zein-containing protein solutions of my invention. In these examples and elsewhere throughout the specification, the term "parts" indicates parts by weight.

*Example 1.*—A solvent mixture containing 72 parts of anhydrous isopropyl alcohol (99%), 40 parts of diethylene glycol and 8 parts of ethylene glycol was added to 30 parts of powdered gluten in a vessel. The mixture was heated to about 160° F. and held at about that temperature for about ½ hour with stirring to extract the zein-containing proteins from the gluten. The mixture was then forced through a filter to separate the zein-containing extract and the extract was then slowly heated to about 250° F. and held at about that temperature, with stirring, until cessation of visible boiling. The residue was a solution of zein-containing proteins principally in the mixture of glycols.

*Example 2.*—A solvent mixture containing 60 parts of a mixture consisting of 90% of denatured 95% alcohol and 10% water, and 40 parts of diacetone alcohol (acetone free) was added to 30 parts of powdered gluten in a vessel. The mixture was heated to about 140° F. and held at about that temperature for about ½ hour, with stirring, to extract the zein-containing proteins from the gluten. The mixture was then forced through a filter to separate the zein-containing extract and the extract was then slowly heated to about 220° F. and held at about that temperature until visible bubbling ceased. At the end point the residue separated into a heavy paste and clear supernatant solvent. Upon the addition of about 1 part of water to the residue, the separated residue came together into solution. This solution was a solution of zein-containing proteins principally in the diacetone alcohol and the small amount of water which was added.

In the following Examples 3 and 4 the manipulative procedures were the same as those set forth in Example 1, with the exceptions hereinafter noted, and in each instance the extracts were heated until most of the relatively low boiling point diluent constituent was removed as indicated by cessation of visible boiling.

*Example 3.*—A solvent mixture containing 60 parts of a mixture consisting of 90% of 91% isopropanol and 10% of water, and 40 parts of a mixture consisting of 75% of diethylene glycol and 25% of ethylene glycol monomethyl ether was added to 30 parts of powdered gluten. The procedure was as in Example 1, except that the extraction temperature was 140° F. The resulting residue after boiling was a solution of the zein-containing proteins principally in the diethylene glycol and glycol ether mixture.

*Example 4.*—A solvent mixture containing 50 parts of a mixture consisting of 90% of 95% ethyl alcohol and 10% of water, and 35 parts of benzyl alcohol was added to 30 parts of powdered gluten. The procedure was as in Example 1, except that the extraction temperature was 140° F. The resulting residue after boiling was a solution of the zein-containing proteins principally in benzyl alcohol.

*Example 5.*—600 parts of 91% isopropyl alcohol were added to 165 parts of powdered gluten in a vessel. The mixture was heated to about 180° F. and held at about that temperature for about ½ hour with stirring to extract the zein-containing proteins from the gluten. The mixture was then forced through a filter to separate the zein-containing extract. To 100 parts of the extract 40 parts of propylene glycol were added and the mixture was slowly heated to about 250° F. and held at about that temperature, with stirring, until cessation of visible boiling. The residue after boiling was a solution of zein-containing proteins principally in propylene glycol.

In the following examples the manipulative procedures were the same as set forth in Example 5, except that the extractions were carried out at 140° F. and the proportions varied as hereinafter set forth. In each instance the mixture of extract and relatively high boiling point solvent was heated until substantially all of the extracting solvent was removed as indicated by cessation of visible boiling.

*Example 6.*—30 parts of powdered gluten were extracted with 75 parts of a solvent mixture consisting of 80% of dioxan and 20% of water. 30 parts of ethylene glycol monoethyl ether were added to 47 parts of the extract. The procedure was as in Example 5 and the resulting solution was a solution of zein-containing proteins principally in ethylene glycol monoethyl ether.

*Example 7.*—30 parts of powdered gluten were extracted with 75 parts of a solvent mixture consisting of 63% of n-butyl alcohol and 37% of water. 19.3 parts of benzyl alcohol were added to 44 parts of the extract. The procedure was as in Example 5 and the resulting solution was a solution of zein-containing proteins principally in benzyl alcohol.

In general, with respect to the preparation of the extract solutions, the extractions are carried out at elevated temperatures say from about 120° to about 170° F., preferably between about 140° to about 150° F., for a short period of time generally not exceeding about three hours and with a solvent to gluten ratio of about 2½–10 parts by weight of solvent to 1 of gluten. It is preferred that the extraction time be not longer than about one-half to about one hour since within this time and at the temperatures stated, the zein in the gluten is extracted and is not deleteriously affected.

In all of the foregoing examples, with the exception of Example 1, the extract solutions, immediately prior to the boiling-off step, comprise zein-containing proteins in solution in a solvent mixture comprising a relatively low boiling point diluent constituent, water, and a relatively high boiling point zein solvent. In Examples 2, 3 and 4, water is present in an amount in excess of that in the azeotropic zein solvent mixture of the relatively low boiling point, non-zein solvent constituent and water. In Examples 5, 6 and 7, the water present is a constituent of an azeotropic mixture which includes the component which is normally a non-solvent for commercial zein, but which in azeotropic admixture with water is a solvent. In Example 1 there is no water present and the relatively low boiling point diluent constituent is not a solvent for commercial zein.

The preferred solutions of zein-containing proteins in accordance with the present invention are obtained from extract solutions which include as a constituent thereof a highly aqueous azeotrope which is a relatively low boiling point solvent for zein, such as the dioxan and water of Example 6 and the butyl alcohol and water of Example 7, either with or without added water, or a low aqueous azeotrope which is a relatively low boiling point solvent for zein, such as 95% ethyl alcohol or 91% isopropyl alcohol, together with added water, as in Examples 2 and 3, for example. Where the extract solutions contain water the solutions resulting from the boiling off procedure also contain water, the amount depending upon the amount of water in the extract solutions and the procedure used in boiling off or distilling from the extract solution the major portion of the relatively low boiling point zein solvent or diluent constituent.

The relatively low boiling point zein solvents above referred to have, in general, a boiling point below about 100° C. Best results are obtained in the extraction procedures when these solvents contain relatively large amounts of water, from about 10 to 40% of water in excess of that present in the azeotropes 95% alcohol and 91% isopropyl alcohol, for example. For convenience herein I term these alcoholic solvents "aqueous alcohol mixtures," and I include within the scope of this expression the highly aqueous azeotropes which are zein solvents, referred to above.

In general, extracting solvents consisting of or including the aqueous alcohol mixtures are capable of extracting larger amounts of zein protein from gluten than are the extracting solvents consisting of or including the relatively low boiling point zein solvents which do not contain substantial amounts of added water. I refer to these latter solvents as "low aqueous zein solvent."

It has been noted that for practical extraction procedures, using either a low aqueous zein solvent alone or an aqueous alcohol mixture alone, approximately 2½ parts by weight of solvent to 1 of gluten may be used. At this concentration, with gluten containing approximately 60% total protein, the extract solutions of the low aqueous zein solvent contain a maximum zein protein content of approximately 10% whereas the extract solutions of the aqueous alcohol mixture solvents contain a maximum zein protein content of from about 12% to about 15% and even up to 20%. In addition, the aqueous alcohol mixture solvents are capable of extracting a substantially larger proportion of a desirable type of zein present in the protein of the gluten than are the low aqueous zein solvents.

The protein content of gluten varies widely, depending largely upon the source of the gluten and the method of making it or obtaining it as a by-product. In the case of corn gluten now on the market, the protein content varies from about 40% to 70%. Of this protein content, about 50% to 70% is aqueous-alcohol soluble and is extractable as zein or zein-containing proteins. The amount of zein or zein-containing proteins extracted in accordance with the methods of the present invention is largely influenced by the particular solvent or solvent mixture used to effect extraction. The amount of relatively high boiling point zein solvent used, in either of the methods of the foregoing examples, should be in a proportion to the amount of zein or other prolamine extracted to give the desired concentration of the prolamine in the final solution. For example, using a corn gluten containing 60% of protein with an estimated extraction of 65%, 39 lbs. of zein or zein-containing proteins are available in 100 lbs. of the gluten. On the basis of producing a final solution in a solvent mixture comprising principally the relatively high boiling point zein solvent of a solids content of 20%, then about 156 lbs. of the relatively high boiling point zein solvent will be required for each 100 lbs. of gluten, providing the estimated amount of soluble protein is extracted.

The relatively high boiling point zein solvents above referred to have a boiling point above about 125° C., preferably above about 150° C. For convenience herein I term these solvents "base solvents." These solvents are compounds or mixtures of compounds which have a suitable balance between the hydrocarbon constituents or radicals present in the solvent or solvent mixtures and the polar constituents or radicals present therein. A certain proportion of hydroxyl radicals in the base solvents (in which term I include mixtures of base solvents) is required to secure solvent action. Other polar radicals such as —O— (ether oxygen), —Cl, —NH₂ and COOH appear to aid or cooperate with the —OH in securing the necessary conditions of polarity in the base solvents for solvent action.

The proportion of polar radicals to hydrocarbon or non-polar radicals which I have found to be desirable lies within a range which extends between the limits of absolute methanol on the one hand, having 53% hydroxyl and 47% hydrocarbon radicals, and absolute ethanol on the other hand having 37% hydroxyl and 63% hydrocarbon radicals. The benzyl radical acts as if it were intermediate the methyl and ethyl radicals. This range is approximate and may vary somewhat depending on the solvent or solvent mixture used. The limits of this range are indicative of solvent properties and provide a close and adequate guide to enable the operator, by simple experimentation, to determine the required balance of polar and hydrocarbon radicals in the base solvent or mixture of base solvents in accordance with the present invention.

It may be stated that the base solvents in accordance with the present invention may be any one of the solvents or mixture of solvents described in my prior Patent No. 2,185,110 which has the required balance of polar and non-polar radicals, and a boiling point above about 125° C., preferably, above about 150° C. as pointed out above. For a more complete description of the kinds of solvents which may be used as base solvents in accordance with the present invention than is disclosed herein, reference is made to the description of these solvents in my prior Patent No. 2,185,110.

Examples of base solvents in accordance with the present invention are the glycols such as diethylene glycol, propylene glycol, triethylene glycol and mixtures thereof, including mixtures which contain ethylene glycol and an impure glycol mixture containing about 90% of diethylene glycol (hereinafter referred to as impure diethylene glycol); diacetone alcohol; closed chain cyclic alcohols such as benzyl alcohol, cyclohexanol, furfuryl alcohol, tetrahydrofurfuryl alcohol and mixtures of closed chain alcohols; glycol ethers such as ethylene glycol monomethyl ether, diethylene glycol monomethyl ether, ethylene glycol monoethyl ether, diethylene glycol monoethyl and mixtures of glycol ethers; mixtures of two or more of the foregoing enumerated base solvents; mixtures of one or more of the foregoing base solvents with glycerine, or other solvents or mixtures of solvents, providing the mixture has the required polar to non-polar radical balance and the required relatively high boiling point. It is to be understood that the foregoing specifically mentioned solvents or mixtures of solvents is not intended to be inclusive of all the base solvents which may be used in accordance with the present invention since they are merely set forth for illustrative purposes.

Zein-containing extract solutions containing any one or more of the foregoing base solvents in accordance with the present invention, may be boiled or distilled to remove most or all of the relatively low boiling point solvent. It is evident that practically all of the relatively low boiling point solvent, including any water in the extract solution, may be removed, thereby obtaining solutions of zein or zein-containing proteins, in the base solvent which, for all practical purposes, are substantially anhydrous. Such solutions vary widely in character, depending upon the choice of solvents or solvent mixtures used, as is to be expected, and some of them may undergo changes (apparent insolubility, for example), during the alcohol and/or water removal which affect the solvent characteristics of the zein-containing proteins in the base solvent utilized. These changes, where they take place, are not of a permanent character and it is possible to effect a resolution of the zein-containing proteins in the base solvents by the addition of a small amount of water, say in the order of from about 1 to 3% by weight, or an equivalent amount of other highly hydroxylated compound, such as methyl or ethyl alcohol.

In my prior Patent No. 2,185,110 I disclosed that solutions of zein can be effected in anhydrous or substantially anhydrous solvents containing not over about 5% of water and that these solutions have good stability and are either non-gelling or have greatly retarded gelling tendencies. I also disclosed in this patent that stable solutions of zein can be produced in substantially anhydrous solvent mixtures of the relatively high boiling point solvents and the lower boiling alcohols.

In my copending application Serial No. 467,402 I described methods whereby solutions of zein-containing proteins in the relatively high boiling point solvents, of desired concentration and protein content, may be produced directly from the corn gluten. According to these methods, the extraction of the zein-containing proteins may be effected either by substantially anhydrous solvents or aqueous solvent mixtures, and that varying amounts and types of zein protein are thus extracted. The ratio of water to alcohol in the extracting solvent used to extract the zein proteins from the corn gluten determines, to a large extent, the amount of protein that may be extracted from the gluten, i. e., the greater the amount of water (up to an amount of about 40% water and 60% alcohol) present in the extracting solvent the more zein protein is extracted. It is also known that in the production of commercial zein, the proportion and amount of water used in the extracting solvent materially influences the solubility characteristics of the zein and the gelling tendency of its solutions.

The end products produced in accordance with the methods of my prior copending application are, generally, solutions of the zein-containing proteins principally in the relatively high boiling point solvents, although it was disclosed that the final solutions may contain some relatively low boiling point constituents, including water. These end products may be obtained as described in the application, by boiling (or distilling) a gluten extract solution comprising zein-containing proteins, a relatively low boiling point diluent (which may be and, preferably, is a zein solvent), including water, and a relatively high boiling point zein solvent, generally, until cessation of visible boiling.

During the boiling off or distillation of the relatively low boiling point diluents contained in these solutions of protein and solvents, especially those containing water, the solutions do not have a constant or steady boiling point that carries throughout the boiling off of any particular low boiling constituent. While the initial boiling point is, generally, about that of the lowest boiling point constituent of the mixture, and may remain somewhat constant during the initial and partial removal thereof, as this material is being removed the temperature of the mass is raised substantially above the boiling point of the relatively low boiling materials and their removal at atmospheric pressure is effected at higher temperatures. For example, temperatures of from about 200° F. to 210° F. and even as high as 250° F. may be required to effect the boiling off of the relatively low boiling point solvents or diluents such as the alcohols, azeotropic dioxan, methyl ethyl ketone, etc. Temperatures of from about 250° F. to 300° F. may be reached before an amount equal to all the relatively low boiling point solvents or diluents, including water, is effected. However, substantial amounts of the relatively low boiling point solvents or diluents may be removed by holding the temperature of the mixture within the boiling point range of the low boiling point solvent or diluents, viz., from about 170° F. to 212° F.

While a portion of the lower boiling alcoholic or equivalent phase of the solvent mixture can be distilled off at about 170° F. to 185° F., temperatures of from about 200° F. to 210° F. are usually required for the removal, within reasonable periods of time, of quantities equal to the amount of the lower boiling material contained in the solvent, while temperatures of from 220° F. and above are required for the practical removal of the relatively higher boiling water phase; and, as before stated, temperatures of from 250° F. to 300° F. may be required for the complete removal of an amount equal to the low boiling solvent phase of the mixture.

The following summary description of several distillations of solvent mixtures containing relatively high boiling point solvents, water and alcohol, but without the presence of extracted zein protein or zein in solution, will serve to indicate the character of the distillates and the residual solvent mixtures resulting from the boiling off and distilling operations. In each instance carbon dioxide was bubbled through the mixture during distillation.

In the following solvent mixtures, these materials were used. Diethylene glycol, having a specific gravity of 1.118; impure diethylene glycol, previously described, having a specific gravity of 1.100; propylene glycol, specific gravity 1.036; carbitol (diethylene glycol monoethyl ether), specific gravity 1.032; 91% isopropyl alcohol, specific gravity 0.814; tap water, and a standard ethyl alcohol solvent consisting of 95% alcohol denatured with methyl alcohol, ethyl acetate, and gasoline, having specific gravities varying from 0.813 to 0.816. All specific gravities at 20° C.

*Mixture in parts*

| Mixture No. | A | B | C | D | E |
|---|---|---|---|---|---|
| Diethylene glycol | 61.6 | | 34.0 | | |
| Impure diethylene glycol | | 51.0 | | | |
| Propylene glycol | | | | 34.0 | |
| Diethylene glycol monoethyl ether | | | | | 65.00 |
| Water | 26.4 | 36.6 | 36.6 | 36.6 | 52.56 |
| 91% isopropyl alcohol | 166.2 | | | | |
| Ethyl alcohol solvent (denatured) | | 146.4 | 146.6 | 146.6 | 122.64 |

Per cent of water based on content of water and high boiling solvent in mixtures

|   | Per cent |
|---|---|
| A | 30.00 |
| B | 41.78 |
| C | 51.84 |
| D | 51.84 |
| E | 44.71 |

| Mixture No. | Initial Boiling Point | Heated to I. B. P. in Min. | Heated from I. B. P. to— | In minutes | Held at final temp., Min. | Total minutes | Distilled off, parts | Sp. gr. distillate | Sp. gr. residue |
|---|---|---|---|---|---|---|---|---|---|
| | °F. | | °F. | | | | | | |
| A | 186 | 27 | 212 | 57 | 8 | 92 | 166.2 | .827 | 1.056 |
| B | 174 | | 210 | 46 | | 46 | 146.4 | .838 | 1.032 |
| C | 174 | 15 | 186 | 30 | | 45 | 149.0 | .833 | 1.025 |
| D | 176 | 20 | 198 | 38 | | 58 | 149.0 | .838 | .984 |
| E | 179 | 19 | 206 | 32 | | 51 | 135.2 | .847 | 1.015 |

The residues obtained by the distillations of mixtures Nos. A, B, D and E are solvents for commercial zein, whereas that from mixture No. C is not a solvent for commercial zein, within the meanings hereinafter described. Solutions of a commercial zein in the zein solvent residues, however, exhibit gelling tendencies on ageing.

It is evident that the boiling off (distilling) procedure materially affects the composition of the resulting distillates and residues of these solvent mixtures and also influences the solvent properties of the residue. This is indicated by the above and by the following.

Aliquot portions of a solvent mixture consisting of 63.6 parts diethylene glycol, 42.6 parts water and 170.1 parts alcohol were distilled as follows:

| Distillation No. | Initial Boiling point | Heated to I. B. P. in Min. | Heated from I. B. P. to— | In Minutes | Held at final temp., Min. | Total Min. used | Distilled off, parts | Sp. gr. distillate | Sp. gr. residue |
|---|---|---|---|---|---|---|---|---|---|
| | °F. | | °F. | | | | | | |
| 1 | 176 | 11 | 202 | 40 | | 51 | 170.1 | .839 | 1.040 |
| 2 | 176 | 22 | 200 | 105 | | 127 | 170.1 | .833 | 1.054 |

The residue of distillation No. 1 is a zein solvent and the residue of distillation No. 2 is a non-solvent.

While the specific gravities of the distillates, as such, do not, with variable compositions, indicate specifically the solvent characteristic of the residue, they can serve in specific cases of similar compositions, as a basis for estimating the probable composition of the residue and enable the making of comparisons.

An understanding of the foregoing distillation phenomena and also of the solubility characteristics of commercial zein in the residual solvent mixtures is essential to an understanding of the present invention. It will be shown, by contrast to the solvent characteristics of the residual solvents as well as solvent mixtures of similar composition, that by operating in accordance with the methods of the present invention it is possible to obtain zein-containing protein solutions of a wide variety of compositions as well as solutions of commercial zein in solvents corresponding with these residual solvents which may contain substantial amounts of water in the order of from about 10% to 40% and even more which have improved solution, stability and working properties, markedly superior to prior art solutions of commercial zein in similar solvent mixtures, and are substantially non-gelling.

It also appears to be desirable for a clear understanding of this invention to define certain terms. Thus, by the terms "solvent for zein" or "suitable solvent for zein," it is to be understood to mean solvents which will produce solutions of zein in concentrations of from about 15 to 25% of zein, at temperatures of from about 110° F. up to about 170° F. to 212° F., and the solutions so produced, when cooled shortly after production to temperatures somewhat below 70° F., viz. about 60° F. or below, are either stable solutions, or solutions which may form solid or separated reversible gels, and which, when the mixture is reheated shortly after the separated gel formation to temperatures of from 70° F. to 80° F. and remixed with stirring, return to a normal, homogeneous solution condition and remain homogeneous at temperature of about 70° F. or above. A "non-solvent for zein" is considered as one whose zein solutions, which are formed at the temperatures above stated, form irreversible gels when cooled shortly after production to about 60° F. or below which do not again form normal solutions on reheating to from 70° F. to 80° F. Solvent mixtures in which the zein remains in a plastic state and does not dissolve at the solution temperatures above stated are also considered as non-solvents for zein.

The phenomena of the formation of reversible or irreversible gels, as above described and used to designate whether a material is a solvent or a non-solvent for commercial zein, is not to be confused with the general phenomena of gelling of zein solutions on ageing. Prior art solutions of zein containing appreciable amounts of water, especially the alcohols, are good solvents for zein and, in general, have good cold stability and do not generally form irreversible gels in the cold. Such solutions do, however, have decided tendencies to gel on ageing of from a period of from a few days to several weeks and become unfit for further use. This gelation of zein solutions with ageing is a common characteristic of aqueous prior art solutions.

It has been the general understanding of the prior art that aqueous solvents are usually necessary to secure zein solubility. It is also known that with particular solvents there is a limit to the amount of water that can be present in a solvent mixture and still have it a suitable solvent media for zein. This is especially so with respect to the relatively high boiling solvents such as the glycols, for example. The limits of the amount of water which, when present in a solvent mixture of the relatively high boiling point solvent and water, will prevent the practical solution of zein is indicated by three representative relatively high boiling point solvents.

Diethylene glycol: approximately 80% diethylene glycol and 20% water.

Propylene glycol: approximately 75% propylene glycol and 25% water.

Diethylene glycol monoethyl ether: approximately 65%, and 35% water.

Although mixtures of zein and the relatively high boiling point solvent-water mixtures, in the proportions above stated, and, generally, in proportions of about 20% zein and 80% solvent mixture, may form solutions of the zein at temperatures of from about 110° F. to 212° F., they will however, when cooled to temperatures of from about 65° F. to 90° F., form separated, irreversible zein gels or solid gels, thereby producing masses unsuited for use. Other concentrations of zein and the solvent-water mixtures act in a similar manner, with the lower proportions of zein to solvent tending to form separated gels and the higher proportions solid gels. While other relatively high boiling point zein solvents may vary in their water tolerance from the amounts above stated, they all have a critical range of solvency which is peculiar to the particular solvent.

The alcohol zein solvents, specifically ethyl and isopropyl alcohols, have, in general, a greater water tolerance before a non-solvent condition is established than do the relatively high boiling point solvents, and it is evident that the presence of an alcohol in the solutions containing relatively high boiling point solvents and water will permit the inclusion of larger amounts of water than would otherwise be possible. Thus, solvent mixtures of relatively high boiling point zein solvents, water and alcohol, either ethyl or isopropyl, can have a water content in relation to the relatively high boiling point solvent content in excess of the amounts above stated, and the mixture still be a solvent for zein. Although these zein solutions of solvent mixtures of relatively high boiling point solvents, water and alcohol have, in general, stability insofar as separation below 70° F. is concerned, it is known that in such solutions of zein when made in accordance with prior art practice, the inclusion of water in excess of about 5% influences the quality of the product, and if present in amounts appreciably above 5% materially accelerates the tendency of the solution to gel, thereby rendering it unfit for further use. Solutions of the character above described which contain an amount of water in excess of the amount that can be included with a particular relatively high boiling point solvent and, in addition, a sufficient amount of alcohol to produce a homogeneous solution in practical zein concentrations of about 20% zein and 80% solvents, have decided gelling tendencies due to the high water content, and, moreover, their low initial boiling point and initial fast evaporating rate, due to the presence of the admixed alcohol, causes congealing of the coating during the initial drying stage, limiting the practicability of these solutions and precluding their use for many important purposes.

The relatively high specific gravities of the distillates of the solvent mixtures previously described indicate that in the removal of the alcohol some water and, perhaps, some of the relatively high boiling point solvent are carried off, either as such, or in the form of complex azeotropes, and it is apparent that the boiled off alcoholic portion does not contain all of the alcohol present in the solvent mixture. Even though the quantity removed by distillation is equal to or even slightly more than the amount of alcohol contained in the original mixture, it is estimated that from about 5 to 15% by weight of the alcohol may be retained in the residue when the removal of the liquid portion has been effected up to an amount approximately equal to the alcohol originally present. When a less amount of liquid is removed the retention is larger.

It is accordingly evident that the residual materials of these distillations contain mixtures of relatively high boiling point solvent, water and some retained alcohol, and these materials may or may not be solvents for commercial zein. If the boiling off of the liquid is carried only to a point of partial removal of the alcohol, or if the boiling off procedure is such that an appreciable amount of water appears to be carried off with the alcohol, the residual material is most likely to be a zein solvent.

In those residues which are solvents for zein the ratios of the water-alcohol proportion to the relatively high boiling point solvent are, manifestly, proper for solution formation. Such mixed solvents may or may not contain amounts of water in excess of that which normally may be used in preparing solutions in accordance with prior art methods. In the solvent residual mixtures which are zein non-solvents it is evident that the water content is in excess of the amount that can be present in a commercial zein solution and still maintain solution.

In accordance with the methods of the present invention, I can prepare substantially non-gelling solutions of zein-containing proteins in solvent mixtures corresponding either with distillation residues which are solvents for commercial zein or distillation residues which are not solvents for commercial zein. Differing from the prior art solutions of commercial zein in similar solvent mixtures, my solutions are of an improved character, substantially free from the defects of the prior art solutions of similar type, and, moreover, may contain amounts of water greatly in excess of the amounts possible in the prior art solutions.

Over a wide range of compositions these improved solutions, have good cold stability, are substantially non-gelling on ageing for practical periods of time of from about 2 or 3 months to a year or even more, in many instances, and do not exhibit the pronounced tendency to congeal and form a separated coating when exposed to the air in a film and evaporation of the water occurs. These solutions are particularly suitable for the making of inks, paper coatings and pigmented flexible coatings, etc.

Concentrations of the zein protein in the solution, the type of zein-protein extracted as determined by the extracting solvent, and specific compositions of the resulting solution may affect the non-gelling properties of these solutions over an extended range of compositions. Such solutions which may have gelling tendencies have, however, generally greater stability than the prior art solutions of similar character.

The methods of preparing the novel zein-containing solutions of my invention are illustrated in the foregoing Examples Nos. 1 to 7, and, as previously stated, comprise, generally, the step of boiling or distilling a zein protein extract solution comprising zein proteins, a relatively high boiling point zein solvent, a relatively low boiling point diluent which may be a zein solvent and water to remove at least most of the relatively low boiling point diluent and, additionally if desired, a small or large part of the water present in the extract solution.

In the foregoing Examples Nos. 1 to 7, the boiling-off procedure is carried to the extent of removing the major portion of the relatively low boiling point diluent and the major portion of the water from the extract solution. In the examples to be hereinafter described the removal of the major portion of the relatively low boiling point zein diluent and a small part of the water present in the extract solution is effected in the presence of zein-containing proteins by procedures corresponding with the production of residue solvents and non-solvents for zein, as described above in connection with the distillations of mixtures A to E.

The zein-protein solutions of my invention may be either of the character of the zein solvent residues in that they may contain some retained alcohol and an appreciable water content which may or may not be in amounts in excess of the amount possible to use in prior art solutions, or they may be solutions in solvents corresponding with the zein non-solvent residues which may contain substantial amounts of water, in amounts in the order of from 25% to 50% or even more of water in the solvent mixture, and with an amount of retained alcoholic or similar low boiling supporting solvent insufficient to effect solution of commercial zein. Differing from the prior art solutions of zein in solvents of the type here contemplated, the solutions of my invention do not, when cooled to somewhat below 70° F., about 50° F. to 65° F., form irreversible gels, and over a wide range of compositions these solutions are substantially non-gelling.

I am not prepared to explain the reason for the different physical and behavior characteristics of the solutions and coating compositions of the present invention, but it is my belief that in the preparation of these solutions the heat treatment of the alcohol-soluble corn gluten proteins in the presence of the solvent mixture, effects a change or modification of the zein-containing proteins, which enable these proteins, when present in solution in solvents comprising principally the relatively high boiling point solvents, to tolerate relatively large amounts of water without exhibiting the gelling and settling tendencies characteristic of solutions of commercial zein containing similar amounts of water. Moreover, the amounts of water which my solutions will tolerate may actually be greater than is even possible of being used in commercial zein solutions prepared in accordance with prior art methods.

*Example 8.*—An extracted zein protein solution was prepared by mixing 7 parts of 41% protein corn gluten with 17½ parts of an extracting solvent consisting of 80% of denatured ethyl alcohol solvent and 20% of added water. The mixture was heated to 140° F. in 30 minutes and held at that temperature, with stirring, for 30 minutes to extract zein proteins. The residual gluten was separated from the extract solution by pressing and the extract solution consisted of 8.5% protein, 18.3% water and 73.2% of ethyl alcohol solvent.

To 200 parts to this extract solution 34 parts of diethylene glycol were added. The composition of this mixture was:

| | Parts |
|---|---|
| Protein | 17.0 |
| Diethylene glycol | 34.0 |
| Water | 36.6 |
| Ethyl alcohol solvent (denatured) | 146.4 |

The mixture was heated and 149 parts were distilled off according to the following procedure, while bubbling carbon dioxide through the mixture: heated to initial boiling point of 178° F. in 25 minutes; heated from 178° F. to 200° F. in 44 minutes. The specific gravity of the distillate was 0.833 which is to be compared with the distillate from mixture C.

The residual protein solution is a substantially non-gelling solution of zein-containing proteins in a solvent mixture comprising principally diethylene glycol, water and some retained ethyl alcohol solvent, and is to be compared with the residue of mixture C which is a non-solvent for zein.

On an approximation based on specific gravities, it is estimated that the final solution contains in excess of about 30% of water, based on the mixture of solvents.

*Example 9.*—An extracted zein protein solution was prepared by mixing 8 parts of 41% protein corn gluten with 16 parts of an extracting solvent mixture consisting of 90% of 91% isopropyl alcohol and 10% added water. The mixture was heated to 140° F. in 30 minutes and held at 140° F., with stirring, for 30 minutes to effect extraction of the prolamine. The residual gluten was separated from the extract solution by pressing and the extract solution filtered. The extract solution consisted of 7.7% protein, 9.2% water and 83.1% of 91% isopropyl alcohol.

To 200 parts of this extract solution 61.6 parts of diethylene glycol and 8 parts of water were added. The composition of this mixture was:

| | Parts |
|---|---|
| Protein | 15.4 |
| Diethylene glycol | 61.6 |
| Water | 26.4 |
| 91% isopropyl alcohol | 166.2 |

The mixture was heated and 166.2 parts were distilled off according to the following procedure, while bubbling carbon dioxide through the mixture: heated to initial boiling point of 175° F. in 25 minutes; heated from 175° F. to 212° F. in 58 minutes; and held at 212° F. 12 minutes to total of 95 minutes. The specific gravity of the distillate was 0.823 and is to be compared with the distillate from mixture A.

The residual material is a substantially non-gelling solution of zein-containing proteins in a solvent mixture comprising principally diethylene glycol, water and some retained alcohol.

On an approximation based on specific gravities, it is estimated that the final solution contains in excess of about 20% of water, based on the mixture of solvents.

*Example 10.*—To 200 parts of an extract solution identical with the extract solution of Example 8 there were added 34 parts of propylene glycol and 149 parts were distilled off while bubbling carbon dioxide through the mixture, as follows: heated to initial boiling point of 178° F. in 20 minutes; held at 180° F. for 25 minutes; and heated to 200° F. in 15 minutes. The specific gravity of the distillate was 0.834 and is to be compared with the distillate from mixture D.

The residual protein solution is a substantially non-gelling solution of zein-containing proteins in a solvent mixture comprising principally propylene glycol, water and some retained alcohol.

On an approximation based on specific gravities, it is estimated that the final solution contains in excess of about 30% of water, based on the mixture of solvents.

*Example 11.*—51 parts of impure diethylene glycol were added to 200 parts of the extract solution of Example 8. The composition of this mixture was:

| | Parts |
|---|---|
| Protein | 17.0 |
| Impure diethylene glycol | 51.0 |
| Water | 36.6 |
| Alcohol (95% denatured) | 146.4 |

This mixture was heated and 146.4 parts were distilled off according to the following procedure, while bubbling carbon dioxide through the mixture: heated to 212° F. in 45 minutes. The specific gravity of the distillate was 0.830 and is to be compared with the distillate of Example B.

The residual protein solution of this example is a substantially non-gelling solution of zein-containing proteins in a solvent mixture comprising principally impure diethylene glycol, water and some retained alcohol.

On an approximation based on specific gravities, it is estimated that the final solution contains in excess of about 25% of water, based on the mixture of solvents.

*Example 12.*—An extract solution was prepared by treating 7½ parts of 60% protein corn gluten with a mixture of 13.09 parts of 70% denatured ethyl alcohol solvent and 5.61 parts of water in accordance with the procedure of Example 8. The extract solution consisted of 12.4% protein, 26.28% water and 61.32% of the 70% alcohol.

65 parts of diethylene glycol monoethyl ether were added to 200 parts of the extract solution. The composition of the mixture was:

| | Parts |
|---|---|
| Protein | 24.8 |
| Diethylene glycol monoethyl ether | 65.0 |
| Water | 52.56 |
| Ethyl alcohol solvent | 122.64 |

The mixture was heated to the initial boiling point of 178° F. in 18 minutes and from 178° F. to 206° F. in 30 minutes, at which time 135.2 parts of distillate were obtained. The specific gravity of this distillate was 0.848 and is to be compared with the distillate from mixture E.

The residual protein solution is a substantially non-gelling solution containing in excess of about 25% of water, based on the mixture of solvents (water content approximated from specific gravities).

The extracted zein protein solutions described in the foregoing examples may, when first made, be somewhat cloudy due to the presence of suspended, insoluble protein matter in apparent colloidal form. On standing, however, these solutions generally become clear with the small amount of insoluble material separating in the form of a miscible glutinous phase, which can be remixed with the clear portion of the solution into a homogeneous mixture and so used.

These solutions, when first made, may be used as is, or with the separated colloidal phase remixed into the solution for most purposes, such as, for example, in inks, coatings, etc. This suspended insoluble portion may be removed by conventional methods of filtration, if desired, or it may be brought into solution by the aid of a suitable mutual solvent such as rosin, sodium resinate, the alcohol amines, the nitro alcohols and the like.

In the production of these solutions I first prepare an extract solution of zein-protein in suitable solvent mixtures comprising a desired relatively high-boiling point solvent, water and a suitable lower boiling point diluent which may not be but preferably is a solvent for zein such as 95% ethyl alcohol or 91% isopropyl alcohol. The extract solution may then be adjusted by desired additions of water or solvents.

While my invention has been described in detail in connection with substantially non-gelling zein-containing solutions derived by the heat treatment of extracted corn gluten proteins, it is not limited to such solutions, for I have found that improved, substantially non-gelling solutions of commercial zein are also obtained by the boiling-off or distillation procedures described. In the preparation of the commercial zein solutions of the present invention it is preferred that the preliminary zein solution in a solvent mixture comprising a relatively high boiling point zein solvent, a lower boiling point diluent and water be heated in accordance with the boiling or distilling procedures corresponding with those hereinabove described which produce residues which are solvents for zein. While, as pointed out above, the distillation residues which are solvents for zein, such as the distillation residues of mixtures A, B, D and E, are capable of producing solutions of commercial zein, such solutions exhibit gelling tendencies whereas the commercial zein solutions of my invention are substantially non-gelling. Moreover, my commercial zein solutions may have a water content, based on the total solvent content, considerably in excess of the amount of water capable of being held in a prior art commercial zein solution. This will be evident from the following.

11 parts of commercial zein were heated with a solvent mixture consisting of 44 parts of impure diethylene glycol and 17 parts of water under varying conditions corresponding with the methods of preparing zein solutions described in my prior Patent No. 2,185,110, but it was impossible to get the zein in solution. Upon the addition of 40 parts of denatured ethyl alcohol solvent the zein dissolved in the solvent mixture. This solution of zein was then heated to remove 40 parts of distillate. The resulting zein solution is stable and substantially non-gelling.

Within the range of the many possible combinations of solvents and the methods in accordance with the present invention, solutions may be produced which require further adjustment or modification in order to secure improved solution or desired stability and controlled gelling properties. Such adjustments or modifications can be readily effected by the use of rosin, fatty acids, compatible amines such as monoethanolamine, triethanolamine, etc., alkali metal or amine soaps of rosin or fatty acids, the nitro alcohols and the like, or by the various methods and materials for producing stable, controlled gelling, zein solutions described in my issued Patents Nos. 2,185,122 and 2,298,548. The addition of suitable materials for effecting desired modification or adjustment may be made to the extract solution or zein solution before distilling off the diluent or to the final solution. The preferable procedure and materials with particular solutions may be readily determined by conventional laboratory procedures.

In general and influenced by the type and amount of zein protein present, the solutions prepared as described above and the coating compositions prepared therefrom have the properties, particularly when heated, of drying and hardening rapidly, and when applied to a surface they quickly and readily form tough, flexible, non-tacky, hard and generally transparent coatings even when retaining some solvent. The coatings formed by these zein and zein-containing solutions and coating compositions are very strong and have adherent properties. In these solutions and coating compositions the film forming properties thereof can be built up to produce films of great toughness, flexibility, hardness and gloss.

The coating compositions prepared from the above solutions may be modified and used as fully described in my application Serial No. 467,402, now Patent No. 2,352,604, granted July 4, 1944. They may also be modified by the addition of compatible melamine condensation products, vinyl alcohol and like unsaturated alcohols, compatible waxes and wax emulsions, glyceryl formyl, azelaic acid and the like; or by the addition of surface tension depressants. Examples of the latter are the neutral sodium and potassium salts of modified rosins the branched chain alkylated sulfated alcohols, the sulfonated and sulfated vegetable oils, the sulfonated petroleum oils, the esters of the sodium sulfo-succinates, for example, the dioctyl ester of sodium sulfo-succinate the alkyl aryl sulfonates such as isopropyl naphthalene sodium sulfonate, and the alkyl sulfates of the fatty alcohols.

Compatible emulsifiers such as glycerine monostearate or other mono- or di-glycerides of the oil and fat fatty acids, the ethanolamine soaps and the like may also be used in my solutions. A little rosin, say 10 to 20%, in the extract solution or zein solution, either before or after boiling, serves to improve the solubility of the protein and to enhance the clarity and brilliancy of the solution, particularly those solutions containing large amounts of water in the order of about 10 to 30%.

While my invention has been described in connection with certain specific examples, it is, of course, obvious that it is not to be construed as limited to these examples or to the details of the methods set forth therein, since obvious changes in materials, proportions and method details will be apparent from the foregoing.

I claim:

1. The method of preparing a zein-containing solution containing substantially in excess of 5% of water comprising heating a zein-containing solution comprising zein a zein solvent having a boiling point above about 125° C. and having a proportion of polar to non-polar radicals which lies within a range extending between the limits of the proportion of polar to non-polar radicals of methanol and the proportion of polar to non-polar radicals of ethanol, said proportion being based on the combining weights of the respective polar and non-polar radicals, a compatible diluent having a boiling point below about 100° C. and water in an amount, exclusive of the diluent, to provide substantially in excess of 5% of water in the solution, until at least the major portion of the diluent is removed.

2. The method of preparing a zein-containing solution containing substantially in excess of 5% of water comprising heating a zein-containing solution comprising zein a zein solvent having a boiling point above about 125° C. and having a proportion of polar to non-polar radicals which lies within a range extending between the limits of the proportion of polar to non-polar radicals of methanol and the proportion of polar to non-polar radicals of ethanol, said proportion being based on the combining weights of the respective polar and non-polar radicals, a relatively low boiling point zein solvent having a boiling point below about 100° C. and water in an amount, exclusive of the relatively low boiling point zein solvent, to provide substantially in excess of 5% of water in the solution, until at least the major portion of the relatively low boiling point zein solvent is removed.

3. The method of preparing a zein-containing solution containing substantially in excess of 5% of water comprising heating a zein-containing solution comprising zein a zein solvent having a boiling point above about 125° C. and having a proportion of polar to non-polar radicals which lies within a range extending between the limits of the proportion of polar to non-polar radicals of methanol and the proportion of polar to non-polar radicals of ethanol, said proportion being based on the combining weights of the respective polar and non-polar radicals, a compatible diluent having a boiling point below about 100° C. and water in an amount, exclusive of the diluent, to provide substantially in excess of 5% of water in the solution, until an amount of solvent corresponding substantially to the amount of diluent in the solution is removed.

4. The method of preparing a zein-containing solution containing substantially in excess of 5% of water comprising heating a zein-containing solution comprising zein, diethylene glycol, a compatible diluent having a boiling point below about 100° C. and water in an amount, exclusive of said diluent, to provide substantially in excess of 5% of water in the solution, until at least a major portion of the said diluent is removed.

5. The method of preparing a zein-containing solution containing substantially in excess of 5% of water comprising heating a zein-containing solution comprising zein, diethylene glycol, a relatively low boiling point zein solvent having a boiling point below about 100° C. and water in an amount, exclusive of the said relatively low boiling point zein solvent, to provide substantially in excess of 5% of water in the solution, until an amount of solvent corresponding substantially to the amount of the said relatively low boiling point zein solvent in the solution is removed.

6. The method of preparing a zein-containing solution containing substantially in excess of 5% of water comprising heating a zein-containing solution comprising zein, propylene glycol, a compatible diluent having a boiling point below about 100° C. and water in an amount, exclusive of said diluent, to provide substantially in excess of 5% of water in the solution, until an amount of solvent corresponding substantially to the amount of the said diluent in the solution is removed.

7. The method of preparing a zein-containing solution containing substantially in excess of 5% of water comprising heating a zein-containing solution comprising zein, propylene glycol, a relatively low boiling point zein solvent having a boiling point below about 100° C. and water in an amount, exclusive of the said relatively low boiling point zein solvent, to provide substantially in excess of 5% of water in the solution, until an amount of solvent corresponding substantially to the amount of the said relatively low boiling point zein solvent in the solution is removed.

8. The method of preparing a zein-containing solution containing substantially in excess of 5% of water comprising heating a zein-containing solution comprising zein, a glycol, a compatible diluent having a boiling point below about 100° C. and water in an amount, exclusive of said diluent, to provide substantially in excess of 5% of water in the solution, until at least a major portion of the said diluent is removed.

9. The method of preparing a zein-containing solution containing substantially in excess of 5% of water comprising heating a zein-containing solution comprising zein, a glycol, a compatible diluent having a boiling point below about 100° C. and water in an amount, exclusive of said diluent, to provide substantially in excess of 5% of water in the solution, until an amount of solvent corresponding substantially to the amount of the said diluent in the solution is removed.

10. The method of preparing a zein-containing solution containing substantially in excess of 5% of water comprising heating a zein-containing solution comprising zein, a glycol, a relatively low boiling point zein solvent having a boiling point below about 100° C. and water in an amount, exclusive of the said relatively low boiling point zein solvent, to provide substantially in excess of 5% of water in the solution, until at least a major portion of the relatively low boiling point zein solvent is removed.

11. The method of preparing a zein-containing solution containing substantially in excess of 5% of water comprising heating a zein-containing solution comprising zein, a glycol, a relatively low boiling point zein solvent having a boiling point below about 100° C. and water in an amount, exclusive of the said relatively low boiling point zein solvent, to provide substantially in excess of 5% of water in the solution, until an amount of solvent corresponding substantially to the amount of the said relatively low boiling point zein solvent in the solution is removed.

12. The method of preparing a zein-containing solution containing substantially in excess of 5% of water comprising heating a zein-containing solution comprising zein, a glycol ether, a compatible diluent having a boiling point below about 100° C. and water in an amount, exclusive of the said diluent, to provide substantially in excess of 5% of water in the solution, until at least a major portion of the said diluent is removed.

13. The method of preparing a zein-containing solution containing substantially in excess of 5% of water comprising heating a zein-containing solution comprising zein, a glycol ether, a compatible diluent having a boiling point below about 100° C. and water in an amount, exclusive of said diluent, to provide substantially in excess of 5% of water in the solution, until an amount of solvent corresponding substantially to the amount of the said diluent in the solution is removed.

14. The method of preparing a zein-containing solution containing substantially in excess of 5% of water comprising heating a zein-containing solution comprising zein, diethylene glycol monoethyl ether, a relatively low boiling point zein solvent having a boiling point below about 100° C. and water in an amount, exclusive of the said relatively low boiling point zein solvent, to provide substantially in excess of 5% of water in the solution, until at least a major portion of the relatively low boiling point zein solvent is removed.

15. The method of preparing a zein-containing solution containing substantially in excess of 5% of water comprising heating a zein-containing solution comprising zein, diethylene glycol monoethyl ether, a relatively low boiling point zein solvent having a boiling point below about 100° C. and water in an amount, exclusive of the said relatively low boiling point zein solvent, to provide substantially in excess of 5% of water in the solution, until an amount of solvent corresponding substantially to the amount of the said relatively low boiling point zein solvent in the solution is removed.

16. The method of preparing a stable, substantially non-gelling zein printing ink vehicle containing substantially in excess of 5% of water comprising heating a zein-containing solution comprising zein, a zein solvent having a boiling point above about 125° C. and having a proportion of polar to non-polar radicals which lies within a range extending between the limits of the proportion of polar to non-polar radicals of methanol and the proportion of polar to non-polar radicals of ethanol, said proportion being based on the combining weights of the respective polar and non-polar radicals, a relatively low boiling point zein solvent having a boiling point below about 100° C. and water in an amount, exclusive of the relatively low boiling point zein solvent, to provide substantially in excess of 5% of water in the solution, until an amount of solvent corresponding substantially to the amount of relatively low boiling point zein solvent in the solution is removed.

ROY E. COLEMAN.

REFERENCES CITED

The following references are of record in the file of this patent:

UNITED STATES PATENTS

| Number | Name | Date |
|---|---|---|
| 2,360,081 | Stewart | Oct. 10, 1944 |
| 2,352,604 | Coleman | July 4, 1944 |
| 2,338,664 | Nadeau | Jan. 4, 1944 |
| 2,194,291 | Bishop | Mar. 19, 1940 |
| 2,185,110 | Coleman | Dec. 26, 1939 |
| 2,115,717 | Hansen | May 3, 1938 |

OTHER REFERENCES

Industrial and Engineering Chemistry, May 1944, pages 408–410.